Figure 1:
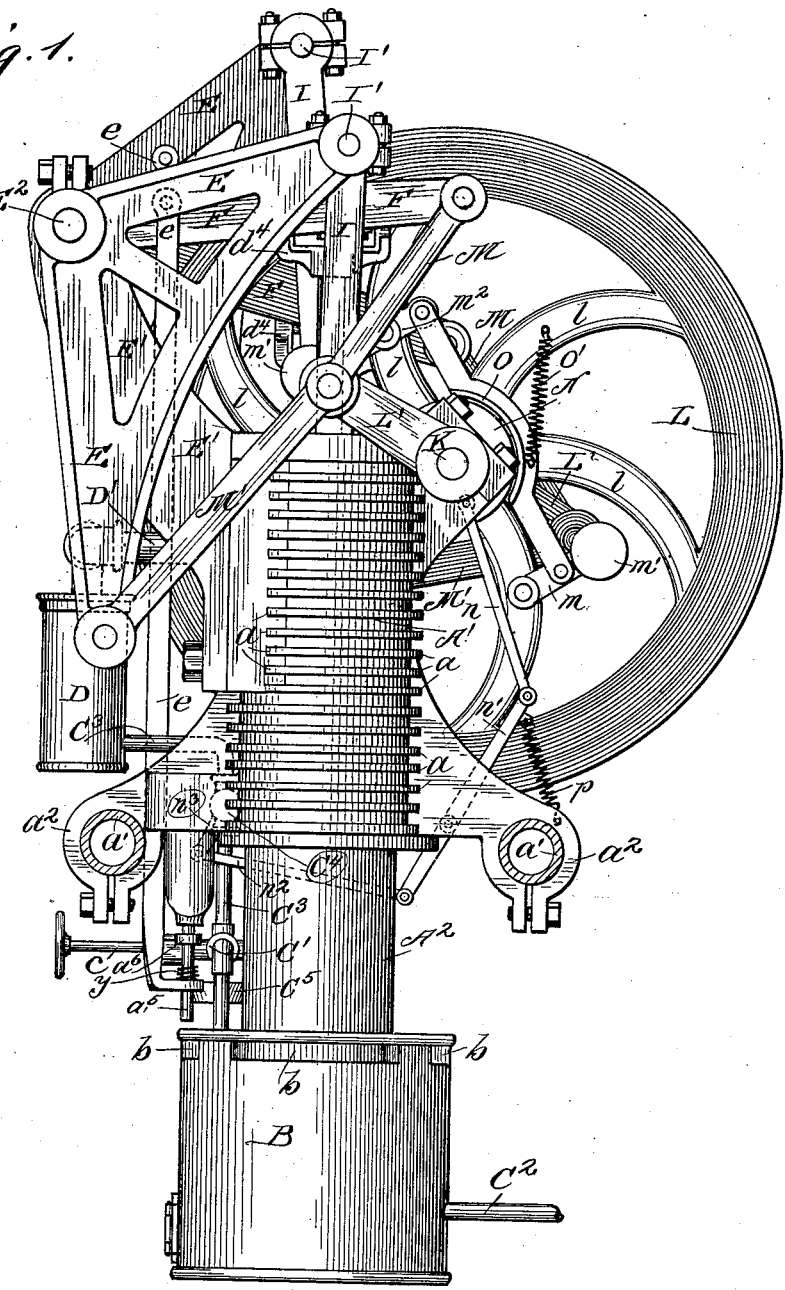

No. 685,367. Patented Oct. 29, 1901.
C. A. ANDERSON, E. A. ERICKSON & J. WICKSTROM.
COMBINATION AIR AND GAS ENGINE.
(Application filed Mar. 27, 1899. Renewed Feb. 20, 1901.)

(No Model.)

5 Sheets—Sheet 1.

Witnesses:
W. J. Jacker,
E. A. Duggan.

Inventors:
Charles A. Anderson
Erick A. Erickson and
John Wickstrom
By Chas. C. Tillman
Atty.

No. 685,367. Patented Oct. 29, 1901.
C. A. ANDERSON, E. A. ERICKSON & J. WICKSTROM.
COMBINATION AIR AND GAS ENGINE.
(Application filed Mar. 27, 1899. Renewed Feb. 20, 1901.)

(No Model.) 5 Sheets—Sheet 2.

Witnesses
W. J. Jacker,
O. A. Duggan.

Inventors:
Charles A. Anderson
Erick A. Erickson
John Wickstrom
By Chas. C. Tillman,
Atty.

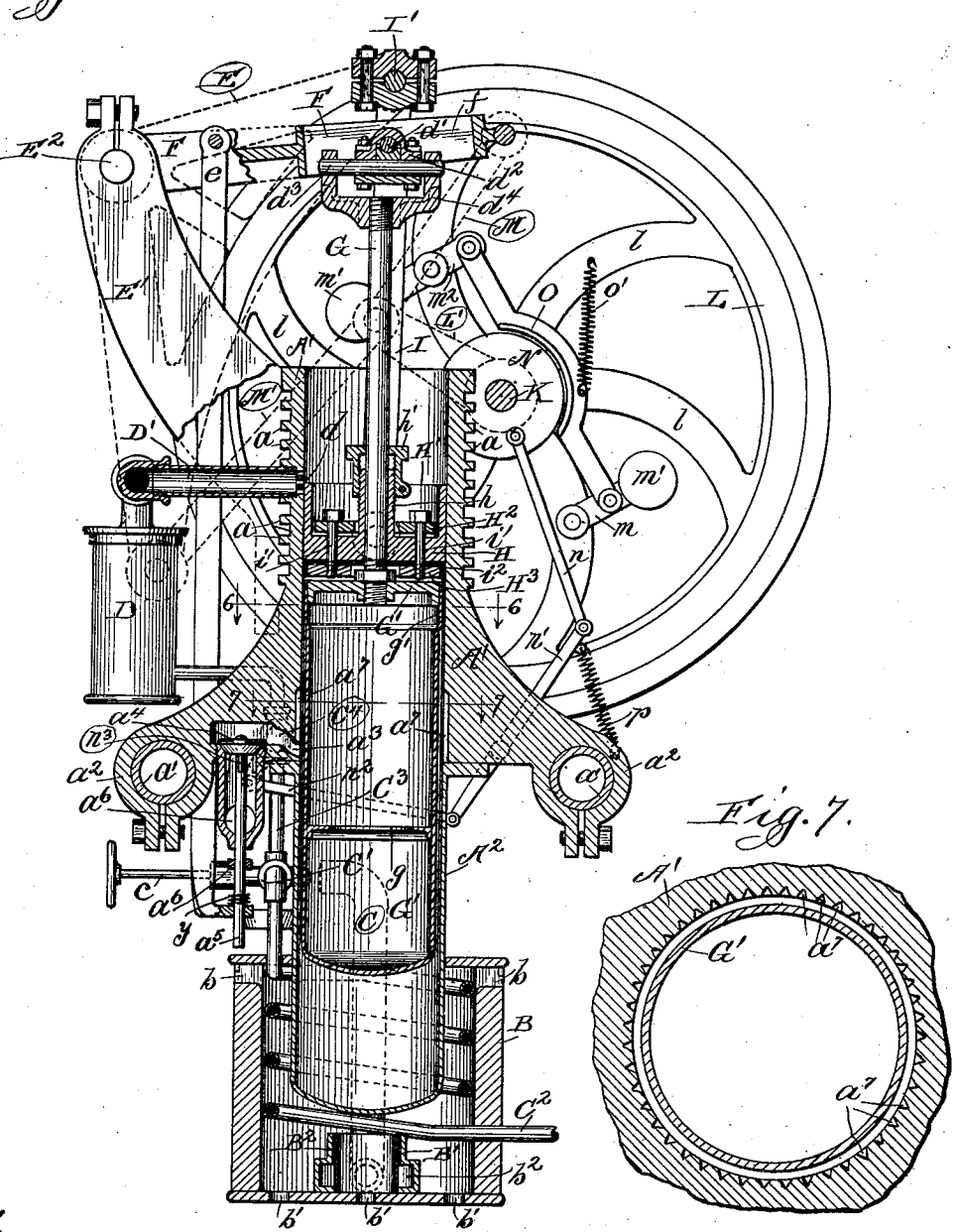

No. 685,367. Patented Oct. 29, 1901.
C. A. ANDERSON, E. A. ERICKSON & J. WICKSTROM.
COMBINATION AIR AND GAS ENGINE.
(Application filed Mar. 27, 1899. Renewed Feb. 20, 1901.)
(No Model.) 5 Sheets—Sheet 4.
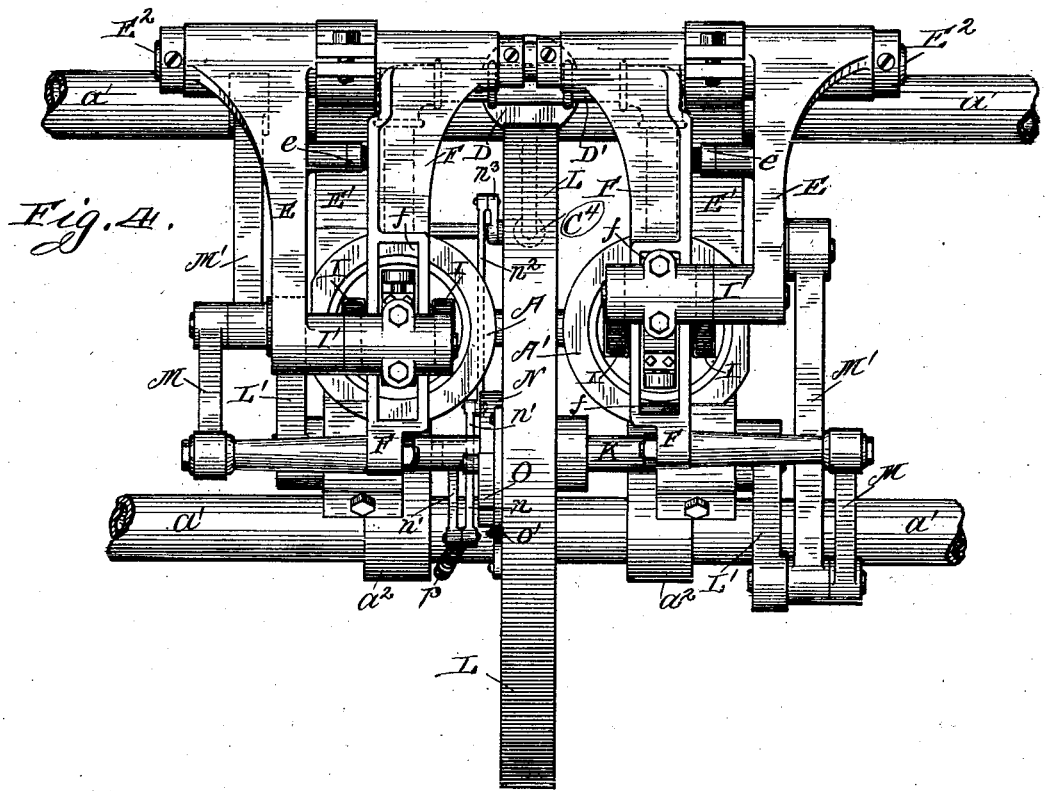
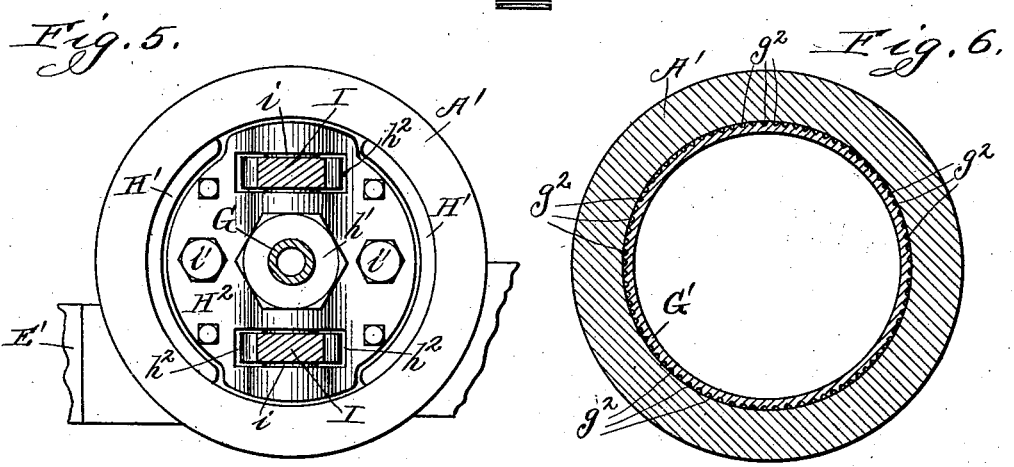
Witnesses:
R. J. Jacker,
E. A. Duggan.
Inventors:
Charles A. Anderson
Erick A. Erickson
By John Wickstrom
Chas. C. Tillman Atty
THE NORRIS PETERS CO., PHOTO-LITHO., WASHINGTON, D. C.

UNITED STATES PATENT OFFICE.

CHARLES A. ANDERSON, ERICK A. ERICKSON, AND JOHN WICKSTROM, OF CHICAGO, ILLINOIS, ASSIGNORS TO THE CHICAGO MOTOCYCLE COMPANY, OF CHICAGO, ILLINOIS, A CORPORATION OF ILLINOIS.

COMBINATION AIR AND GAS ENGINE.

SPECIFICATION forming part of Letters Patent No. 685,367, dated October 29, 1901.

Application filed March 27, 1899. Renewed February 20, 1901. Serial No. 48,172. (No model.)

*To all whom it may concern:*

Be it known that we, CHARLES A. ANDERSON, ERICK A. ERICKSON, and JOHN WICKSTROM, citizens of the United States, residing at Chicago, in the county of Cook and State of Illinois, have invented certain new and useful Improvements in a Combination Air and Gas Engine, of which the following is a specification.

This invention relates to improvements in an engine in which air and gas are combined and caused to be heated and exploded and expanded to give impulse to the pistons; and it consists in certain novel features of the construction and combinations and arrangements of parts, as will be hereinafter more fully set forth and specifically claimed.

The principal objects of our invention are to provide an engine of an efficient and durable construction wherein a motor impulse is given at every outward or upward stroke of the power-piston, to provide means to supply a mixture of air and gas or other expansible substance to the cylinder between the power and displacer pistons and to cause said mixture or substance to be heated and exploded and expanded or heated and expanded in a hot chamber, thereby attaining greater efficiency and more perfect combustion, and to furnish an engine of such a construction that it can be operated as a combined hot-air and gas engine or as a hot-air engine only.

In order to enable others skilled in the art to which our invention pertains to make and use the same, we will now proceed to describe it, referring to the accompanying drawings, in which—

Figure 2:
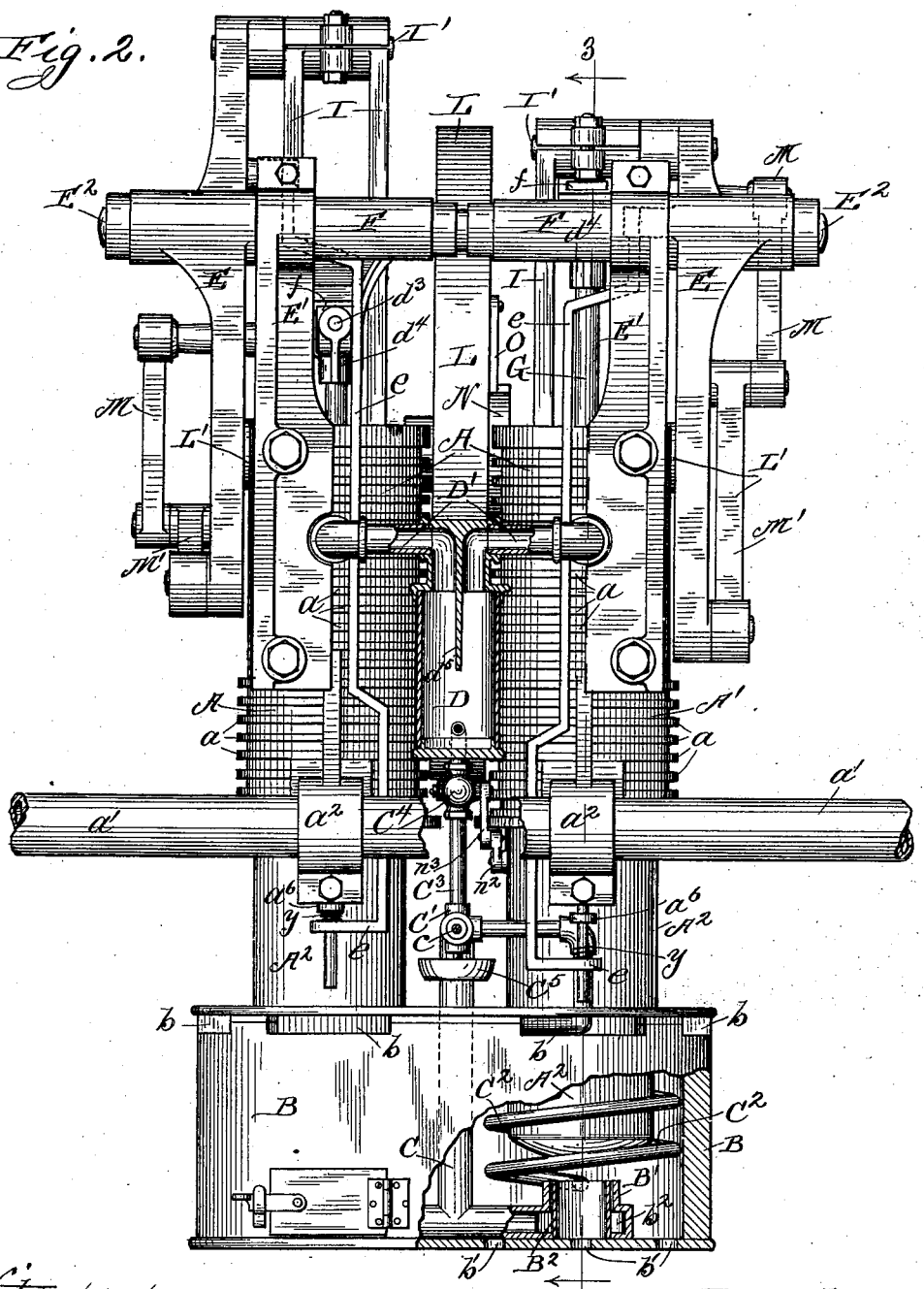
Figure 8:
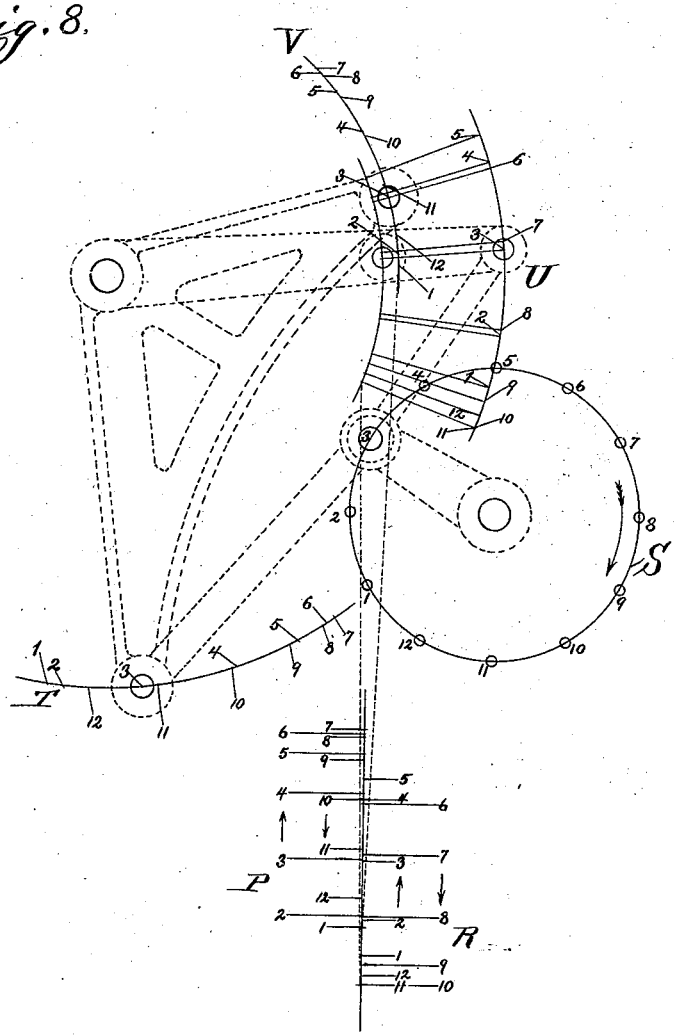

Figure 1 is a view in side elevation of an engine embodying our invention. Fig. 2 is a view in elevation, partly in section, of the engine. Fig. 3 is a vertical sectional view taken on line 3 3 of Fig. 2 looking in the direction indicated by the arrows. Fig. 4 is a plan view. Fig. 5 is a similar view of the top of one of the cylinders, showing the rod and bars for operating the pistons in section. Fig. 6 is a plan sectional view taken on line 6 6 of Fig. 3, showing one of the cylinders and the displacer-pistons therein. Fig. 7 is a similar view of like parts, taken on line 7 7 of Fig. 3; and Fig. 8 is a diagrammatical view illustrating the relative movements of the operating parts of the engine.

Similar letters refer to like parts throughout the different views of the drawings.

A and A' represent the cylinders proper of our engine, which are preferably provided on their outer surfaces with a series of annular ribs $a$, as shown in the drawings, to afford greater radiating-surface, thereby preventing the cylinders becoming overheated. These cylinders are shown as being supported by means of tubes $a'$, which pass through suitable brackets $a^2$, formed in the lower portion of the cylinders, but may be supported in any other convenient or desired manner. Secured to the lower surface of each of the cylinders is a cylindrical extension $A^2$, whose bottom is closed and which is preferably made of thin material in order to enable it to be quickly heated. These extensions on the inner surface have their walls coincident with the walls of the cylinder proper, and in conjunction with the cylinders A and A' constitute the complete cylinders for the operation of the power and displacer pistons. In the drawings we have shown these extensions as being separate from the main or upper portion of the cylinder; but we may, if desirable, form them as an integral part of the cylinders. Surrounding the lower ends of the lower portions $A^2$ or extensions of the cylinders is a fire-box B, of any suitable size, form, and material, and which is provided with openings $b$ and $b'$ in its upper and lower portions, respectively, for the passage of air and products of combustion from the fuel employed for heating the cylinders.

Located on the floor of the fire-box and directly below the extensions $A^2$ or lower parts of the cylinders are burners, each of which comprises a tubular piece $B'$, having in its lower portion an annular channel or groove $b^2$, which communicates with the pipe C, which supplies gas to the burners, as will be presently explained.

Within each of the tubular pieces $B'$ is another tubular piece $B^2$, which is somewhat smaller than the piece B', thus leaving a space between said pieces for the passage of the gas. The pipe C extends upwardly through the fire-box between the cylinder extensions and has its upper end open and bent, as shown by dotted lines in Fig. 3 of the drawings, to receive the vapor as it is discharged from the nozzle of the starting-burner or vapor-injector C', which may be of the ordinary or any preferred construction and provided, as usual, with a needle-valve $c$ to regulate the discharge of vapor. Spirally coiled around the lower portion or extension $A^2$ of one of the cylinders and within the fire-box is a pipe $C^2$, one of whose ends communicates with a source of oil-supply under pressure (not shown) and which pipe passes through the top of the fire-box near the cylinder, a portion of which it surrounds, and then laterally to a point opposite the upper end of the pipe C, at which point it is provided with a burner or vapor-injector C', beneath which burner is located an oil-cup $C^5$, used for starting the vaporization of the oil. Extending upwardly from the burner C' is another pipe $C^3$, which communicates with the mixing vessel or chamber D, located near the upper portion of the cylinders proper. Between the burner C' and the mixing chamber or vessel D the pipe $C^3$ is provided with a valve $C^4$, of the ordinary or any preferred construction, which is employed to regulate the flow of vapor into the mixing-chamber. Communicating at one of their ends with the upper portion of the mixing chamber or vessel D are pipes D', which communicate at their other ends through suitable ports $d$ with the upper portion of the cylinders. The ends of the pipes D' communicating with the vessel D are separated by a partition $d^5$, which extends some distance into said vessel to cause the current to reach to about the bottom of the vessel, so as to withdraw all of the mixture therefrom. Each of the cylinders in the lower portion of the main parts A and A' thereof is provided with an exhaust-port $a^3$, in which is seated a valve $a^4$, whose stem $a^5$ extends down through an exhaust-pipe $A^6$, which communicates at one of its ends with the exhaust-port and may have its other end open or free.

The stem $a^5$ of each of the valves $a^4$ is provided at a suitable point below the exhaust-pipe, through which it extends, with a lug or projection $a^6$ to strike against said pipe when the valve is raised by means of the rod or bar $e$, which engages at its lower end the valve-stem and is pivotally secured at its other end to the bell-crank lever E, which is fulcrumed on a bracket E', with which each of the cylinders is provided at its upper portion.

On the shaft $E^2$, which is secured in the upper portion of the brackets E' and on which the bell-crank levers E are journaled, are also journaled, so as to extend diametrically over the tops of the cylinders, arms F, each of which is provided with a longitudinal slot or opening $f$, in which the upper end of the displacer-piston rod G is journaled. Extending across the slot or opening $f$ in the arm F is a shaft $d'$, on which is mounted a journal-box $d^2$, through the lower portion of which passes at right angles to the shaft $d'$ a shaft $d^3$, whose ends are secured to a forked piece $d^4$, located on the upper end of the rod G, which is hollow and has its other end secured to and communicating with the upper portion of the displacer-piston G', which is of a size somewhat smaller than the interior of the cylinder and may be provided in its lower portion with a transverse piece $g$ to strengthen or brace the same.

The upper part of the displacer-piston G' is slightly enlarged, as at $g'$, so that said portion will fit within the cylinder more closely than the part of the displacer-piston below said enlargement. In its enlarged portion $g'$ the said piston is provided on its external surface with a series of vertical grooves $g^2$ (see Fig. 6) to equalize the pressure between the upper and lower portions of the displacer-piston. The main parts A and A' of the cylinders are provided with internal grooves $a^7$ (see Figs. 3 and 7) for the free passage of air and gas from the space above the displacer-piston to the space below the same.

Located in the upper portion of each of the cylinders is a power-piston H, which is preferably formed with two segmental flanges H', which extend upwardly and serve to strengthen as well as guide the said piston. This piston is provided in its center with an upwardly-extending tubular portion $h$, through which the displacer-piston rod G passes and on which is secured a stuffing-box $h'$, of the ordinary or any preferred construction. Located on the upper surface of the piston H is a plate $H^2$, which is provided with slots $h^2$ for the reception and operation of the piston rods or bars I, whose lower ends are journaled on pins or shafts $i$, located in suitable bearings furnished by the piston H and plate $H^2$, which plate is secured to the piston by means of bolts $i'$, whose lower ends engage a ring $H^3$, located on the lower surface of the piston H, and between which ring and piston is interposed a washer $i^2$, of leather or other flexible material, to cause the piston to fit the cylinder closely. The upper ends of the piston rods or bars I are journaled on a suitable shaft I' on the upper arm of the ball-crank lever of each cylinder and are arranged parallel with one another and at a sufficient distance apart to allow of the free movement therebetween of the arm F, which carries the displacer-piston rod of each cylinder. Journaled in suitable bearings on the upper portion of the cylinders is the main or driving shaft K, on which the balance-wheel L is mounted or fixed. This shaft is provided at each of its ends with a crank L', which are pivotally connected to the pitman rods or bars M and M', whose other ends are pivotally secured to the ends of the arms F and bell-crank levers E, respectively, of each of the cylinders.

Loosely mounted on the shaft K, on one side of the balance-wheel, is a friction-disk N, to which is pivotally secured at one of its ends a rod $n$, whose other end is similarly secured to the upper end of a lever $n'$, fulcrumed at a suitable point on one of the cylinders or other suitable support, to the lower end of which lever is pivotally connected at one of its ends a rod $n^2$, whose other end is pivotally connected to a rod or arm $n^3$, secured to the stem of the valve $C^4$, which is located in the vapor-pipe $C^3$ and controls the flow of vapor therethrough. Pivotally secured at one of its ends to one of the spokes $l$ of the balance-wheel is a governor-arm $m$, which is provided at its free end with a weight or governor $m'$, and fulcrumed on one of the spokes of the wheel about diametrically opposite the pivot-point of the arm $m$ is a lever $m^2$, provided on its longer end with a governor or weight $m'$, while on its shorter arm is pivotally secured one end of a brake-shoe O, the other end of which is pivotally secured to the arm $m$ at a slight distance from its pivot. This brake-shoe, which comprises a part of the governor for our engine, is normally held by a spring $o'$ at a slight distance from the disk N; but as the speed of the engine increases the governors or weights will be moved outwardly by reason of the centrifugal force, and thus cause the brake-shoe to contact with the disk N, which will then revolve with the wheel until checked by reason of the rod $n$ and lever $n'$, the latter of which, as before stated, has a connection at its lower end with the valve $C^4$, controlling the flow of vapor.

In Fig. 8 of the drawings we have illustrated by a diagrammatical view the relative positions of the moving parts of our engine, in which view the group of numerals indicated by the letter P represent the various positions assumed by the power-piston in its downward and upward strokes, while the group R indicates the positions of the displacer-piston, the arrows in said groups showing the direction of the movement of said pistons. The group of numerals S indicates the relative positions of the crank, while the group T shows the positions of the lower end of the bell-crank lever. The group U indicates the positions of the outer bearing on the displacer-carrying arm F, and V is the group indicating the positions of the upper end of the bell-crank lever.

In the foregoing we have described our engine as if the cylinders thereof were in an upright position and have spoken of the upper and lower ends thereof; but the cylinders may be placed in a horizontal position, in which arrangement the terms "upper" and "upward" should be construed as synonymous with "outer" and "outward," and the terms "lower" and "downward" should be construed as synonymous with "inner" or "inward," and in the following description we may so use said terms.

The operation of our engine is as follows: A sufficient quantity of oil or other inflammable substance is placed in the oil-cup $C^5$ and ignited and allowed to burn to start the vaporization of oil in the burner or vapor-injector $C'$, from which it will be discharged through the nozzle thereof into the open upper end of the pipe C, through which pipe it will pass into the burners $B'$ within the fire-box, at which points it may be ignited, thus heating the extension $A^2$ or lower portions of the cylinders. The oil within the supply-pipe $C^2$, surrounding one of said extensions, will be caused by the heat emanating from one of the burners to vaporize and pass through the pipe $C^3$ into the mixing vessel D, from whence the mixture of vapor and air will be discharged through the ports $d$ into the cylinders between the power and displacer pistons. By reference to Fig. 8 of the drawings it will be seen and readily understood that when the displacer-piston is at 5, group R, and is ready to begin its downward or inward stroke the power-piston will be at 5, group P, some distance from the limit of its upper or outward stroke. When the displacer-piston shall have traveled to 7, group R, the power-piston will have reached 7, group P, or the limit of its outward stroke, the pistons moving from each other will create a partial vacuum within the cylinder and draw the mixture of gas and air through one of the pipes $D'$ into the cylinder between the two pistons, during which operation the pipe $D'$, communicating with the other cylinder, is free to receive air through the top of the cylinder and the port $d$ thereof, the pistons in said cylinder being in their downmost or inward positions. When the displacer-piston shall have reached the point 9, group R, the power-piston will have only traveled to 9, group P, a small fraction of its downward or inward stroke. When this large space between the two pistons is being filled with the mixture of coal-gas or hydrocarbon vapor and air from the vessel D, the hot gases in the lower end of the cylinder are forced out through the exhaust-port $a^3$, valve $a^4$, and exhaust-pipe, $a^6$ into the open. At the points indicated by 10 11 12, group R, the displacer-piston remains practically stationary, while the power-piston makes the greater part of its downward or inward stroke, thus compressing the mixture. While the power-piston travels over its dead-center, or from 12, 1 to 2, group P, the displacer-piston approaches the power-piston very rapidly, thus displacing the mixture of gas and air from the cool space between the pistons to the space in the lower ends of the cylinder, said displacement or flow of gas and air taking place through the grooves $a^7$ on the inside of the lower part of the cylinder and then through the annular space between the displacer-piston and extended part of the cylinder, the mixture in its passage becoming heated, so as to ignite, thus producing very great pressure. Now by reason of the peculiar motion imparted to the displacer and power pistons both of them move at practically uniform speed during the greater part of their upward or out stroke, thus leaving the hot gases to expand in the heated space of the lower or inner portion of the cylinder, the expansion thus effected being of much higher efficiency than if the gases were permitted to expand in full contact with the cool parts of the cylinder, and besides the combustion of the gases will be more perfect, as is apparent. When the parts are at the points indicated by 5 in the diagrammatical view, the exhaust-valve $a^3$ is opened through the instrumentality of the rod or bar $e$, which, as before explained, engages the lower end of the stem of said valve, thus permitting what pressure there may be left to escape through the exhaust-pipe into the atmosphere, the displacer-piston in its downward or inward stroke expelling what remains, said hot gases in their passage to the exhaust-valve leaving part of their heat to the lower or inner end of the cylinder and displacer-piston, which will part with it again to the next incoming charge in heating it to the point of ignition.

The above-explained operation transpires in the cylinders alternately, as is apparent, and as the speed of the engine increases the brake-shoe O will be caused to impinge the disk N on the driving-shaft K by reason of the centrifugal movement of the governors, thus causing the said disk to revolve with said shaft and through its connections with the stem of the valve $C^4$ to partially or entirely close said valve, thus regulating the supply of vapor to the mixing vessel and from thence to the cylinders. It is apparent that when said valve is entirely closed the engine will operate as a hot-air engine on the air taken into the cylinder through the mixing vessel. As the speed of the engine is slackened and the brake-shoe is removed from the disk the spring $p$, secured at one of its ends to the lever $n'$ and at its other end to a suitable support, will retract said lever and through its connections open the valve $C^4$ and again allow the passage of vapor therethrough.

As before mentioned, the piston-rods G of the displacer-pistons are tubular and form a communication with the interior of the said pistons and the atmosphere, thus providing atmospheric pressure in said pistons to prevent possibility of explosion by reason of the accumulation of the mixture in said pistons through leaks.

In the operation of the bell-crank levers E and arms F, which carry the piston rods or bars I and G of the power and displacer pistons, respectively, it is apparent that the said levers and arms will describe arcs of a circle, and to permit of this the bars I are journaled at their upper ends to shafts I' on the upper ends of said levers and to the pins or shafts $i$ on the power-pistons, which construction permits of the necessary oscillating movement thereof; but the piston-rods G of the displacer-piston must operate with a rectilinear movement, and to permit this they are movably journaled on the arms F, as above explained.

While we have shown the fire-box provided with the burners B' and siphon-pipe C and prefer to use said means of heating the cylinders and vaporizing the oil, yet we may use any other suitable or desired kind of burners or fuel without departing from the spirit of our invention.

From the foregoing it will be clearly understood that our engine is a convertible one that can be used as a combination air and gas engine or as an air-engine only by shutting off the supply of vapor to the mixing vessel or cylinder.

Having thus fully described our invention, what we claim as new, and desire to secure by Letters Patent, is—

1. The combination of a cylinder having a heater at one end, and provided with a port for the passage of air and a mixture of air and gas and an exhaust-port, with a power-piston and a displacer-piston located in said cylinder, and means to supply an explosive mixture of air and gas to the cylinder between the pistons thereof, substantially as described.

2. The combination of a cylinder having a heater at one end, with a power-piston and a displacer-piston located therein, the displacer-piston having a communication with the atmosphere, and means to supply an explosive mixture of air and gas to the cylinder between the pistons thereof, substantially as described.

3. The combination of a cylinder having a heater at one end, with a power-piston and a displacer-piston located therein, means to supply an explosive mixture of air and gas to the cylinder between the pistons thereof, means to compress said mixture in the cooler portion of the cylinder and to cause it to expand in the hot portion of the cylinder, substantially as described.

4. The combination of a cylinder having an exhaust-port and a supply-port, and a heater at one of its ends, with a power-piston and a displacer-piston located in said cylinder, means to supply an explosive mixture of air and gas between the pistons through the supply-port, and a mechanism to cause the pistons to compress said mixture in the cooler portion of the cylinder and to transfer said mixture and cause it to expand in the hot portion of the cylinder and to exhaust from the hot portion of the cylinder, substantially as described.

5. The combination of a cylinder having a heater at one end, with a power-piston and a displacer-piston located therein, the displacer-piston having an annular enlargement to cause said enlarged portion to fit a part of the cylinder more closely than the reduced portion of the displacer-piston, and means to supply an explosive mixture of air and gas to the cylinder between the pistons thereof, substantially as described.

6. The combination of a cylinder having a heater at one end, with a power-piston and a displacer-piston located therein, said displacer-piston having an annular enlargement to cause said enlarged portion to fit a part of the cylinder more closely than the reduced portion of the displacer-piston and more closely than another part of the cylinder, means to supply an explosive mixture of gas and air to the cylinder between the pistons thereof, and means to compress said mixture in the cooled portion of the cylinder and to cause it to expand in the hot portion thereof, substantially as described.

7. The combination of a cylinder having a heater at one end, with a power-piston and a displacer-piston located therein, grooves located within a part of the cylinder, the displacer-piston having an annular enlargement to cause said enlarged portion to fit a part of the cylinder more closely than the reduced portion of the displacer-piston, means to supply an explosive mixture of gas and air to the cylinder between the pistons thereof, and means to compress said mixture in the cooler portion of the cylinder and to expand in the hot portion of the cylinder and discharge from the hot portion of the cylinder, substantially as described.

8. The combination of two cylinders each having a supply-port, with a mixing vessel provided with a partition extending thereinto, pipes communicating with said vessel and the cylinder-ports, pistons located in the cylinders, means to operate said pistons alternately to cover and uncover said ports, substantially as described.

CHARLES A. ANDERSON.
    ERICK A. ERICKSON.
    JOHN WICKSTROM.

Witnesses:
 CHAS. C. TILLMAN,
 E. A. DUGGAN.